Patented Feb. 26, 1935

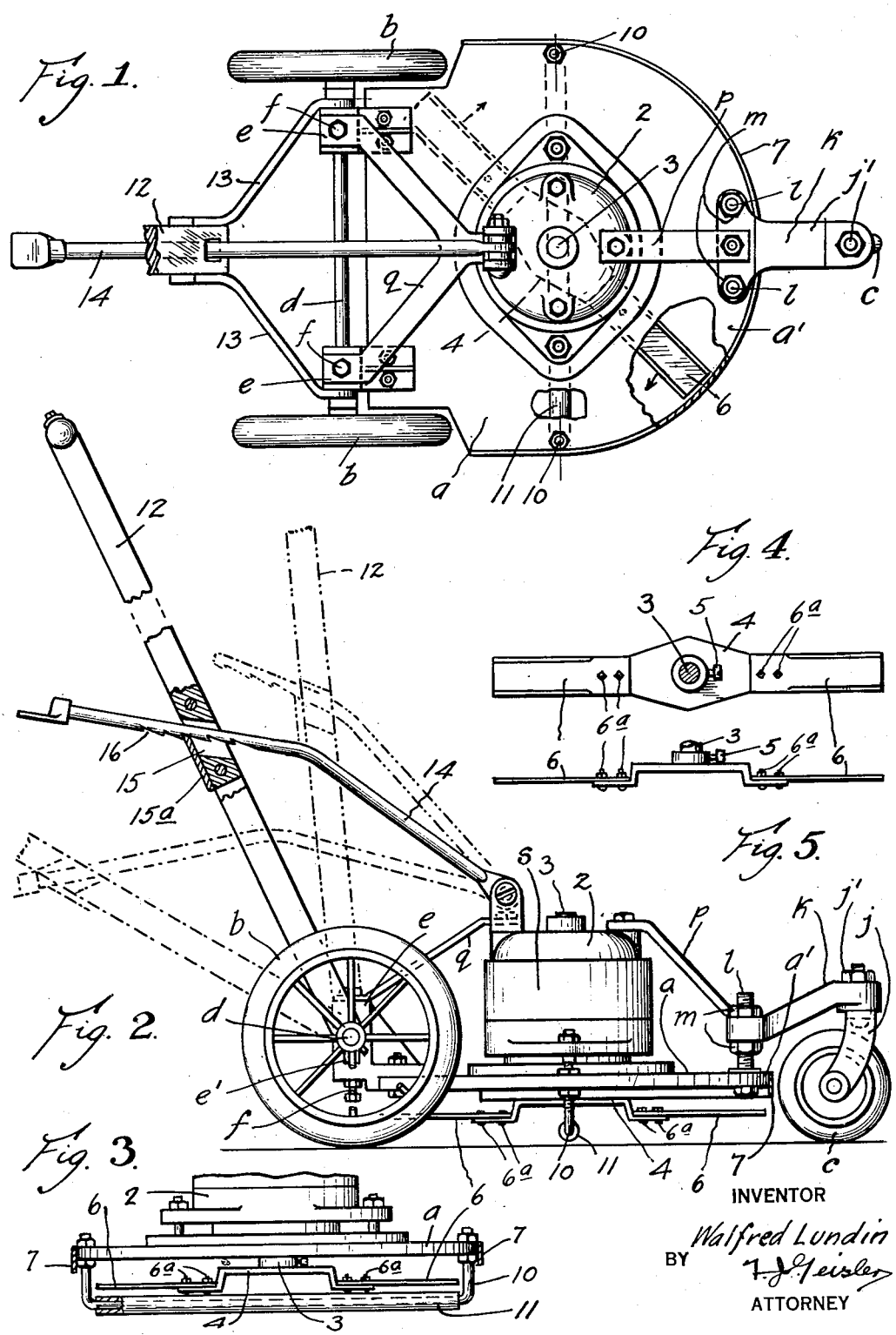

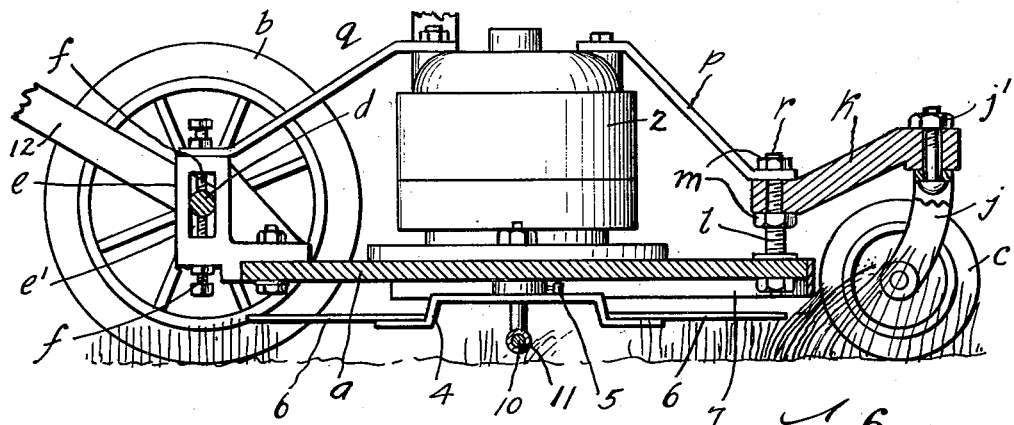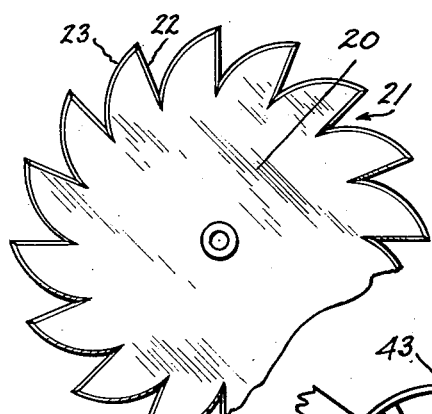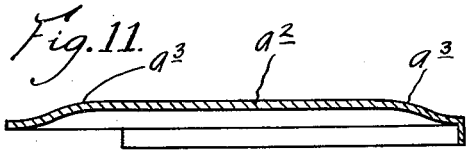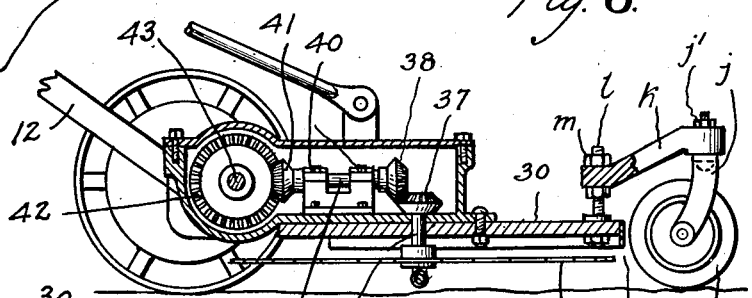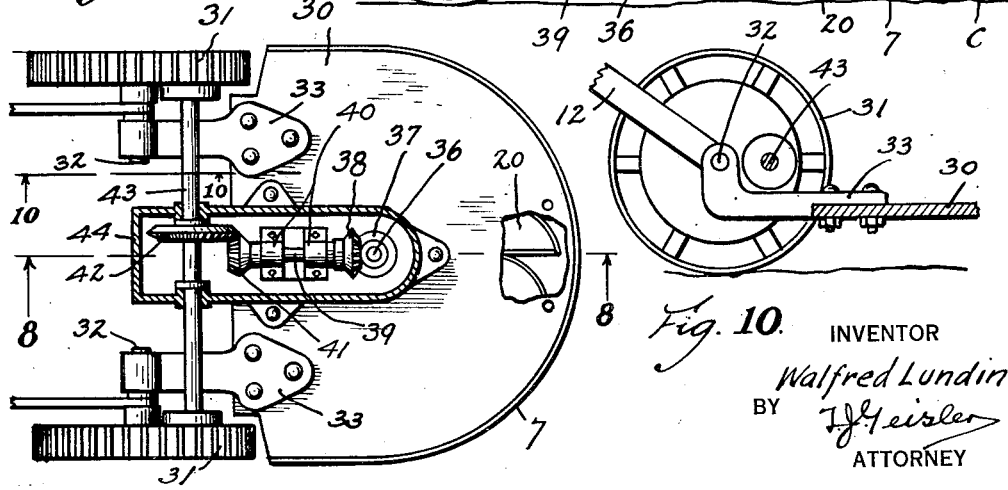

1,992,494

UNITED STATES PATENT OFFICE 1,992,494

LAWN MOWER

Walfred Lundin, Maplewood, Oreg.

Application March 7, 1932, Serial No. 597,173

1 Claim. (Cl. 56—25)

My invention relates to lawn mowers and the like.

The object of my invention is to provide a sturdy lawn mower of simple construction having a single rotary blade operating upon a vertical axis, similarly to a sickle, as it were, thus being especially adapted for cutting tall grass and to perform the cutting operation more evenly and efficiently than in the mowers in present use; and furthermore to provide for the adjustment of the blade relatively to the ground.

A further advantage of having a single rotating blade is that twigs and other hard substances which may be struck by the blade, can not interfere with its operation, but will be merely brushed aside. In the mowers in present use which have two or more cooperating blades, any hard substance which catches between them stops their rotation and thus delays the operation of the mower.

A further object of my invention is to provide such a lawn mower provided with means on its forward edge adapted to bend the taller grass down in advance of the blade to hold it and facilitate the cutting operation of the blade, such means also serving as a guard to prevent the blade being brought into contact with any hard or relatively immovable object.

A further object of my invention is to provide a lawn mower, the rear ground wheels of which are arranged in the rear of and within the lateral dimensions of the swath cut by the blade, thereby to cut the grass standing in the path of the mower, which would otherwise be pressed down by the said rear wheels and missed by the blade, thus leaving an unevenly cut lawn as the result; also by such construction to provide a mower adapted to cut closely up to a wall and the like.

The above described and other incidental features of my invention, I attain by the construction which is hereinafter fully set forth with reference to the accompanying drawings.

In the drawings:

Fig. 1 shows a plan view of my mower with a portion broken away to illustrate the relative arrangement of the blade;

Fig. 2 shows a side elevation of the same and illustrates further details of construction;

Fig. 3 shows a fragmentary front elevation of my mower with the forward ground wheel removed;

Fig. 4 shows a plan view of the blade removed from the machine;

Fig. 5 shows a side elevation of the same;

Fig. 6 shows an enlarged side elevation of my mower partly in section and illustrates the mode of operation of the blade;

Fig. 7 shows a modified form of the blade removed from the mower;

Fig. 8 shows a section taken on the line 8—8 of Fig. 9 and illustrates a modification of my mower in which the blade is driven by the rotation of the ground wheels;

Fig. 9 shows a plan view of my mower as illustrated in Fig. 8;

Fig. 10 shows a section taken on the line 10—10 of Fig. 9 and illustrates further details of construction; and Fig. 11 shows a sectional view of a modified platform upon which the driving motor is supported, the same being convexed to permit of lighter construction without loss of strength and rigidity.

Referring now to Figs. 1 to 6: My mower comprises a body or platform $a$ provided with rear ground wheels $b$ and a smaller caster-like front ground wheel $c$. The ground wheels $b$ are rotatably mounted upon a transverse shaft $d$ secured to the platform $a$ in rearwardly extending brackets $e$. The brackets $e$ are provided with vertical elongate slots $e'$ in which the shaft $d$ is mounted. Opposed set screws $f$ are threaded in each end of the said slots and bear upon the axle $d$. By these means the platform $a$ is vertically adjustable upon the wheels $b$ relatively to the ground.

The smaller wheel $c$ is carried by a rearwardly curved forked or caster member $j$ rotatably secured to a bracket $k$ adjustably secured to the platform $a$ by bolts $l$ and nuts $m$, $m$. The caster member $j$ may be rigidly held to the bracket $k$, if desirable, by tightening the nut $j'$.

In the center of the platform $a$ is preferably mounted a vertical shaft electric motor 2 inclosed in a housing $s$, although other types of motors may be used as well. In case of an electric motor, power is supplied to the motor 2 by an electric cable (not shown) suitably connected with a source of electric power and intended to be drawn along behind the mower.

The shaft 3 of the motor extends through the platform $a$ and is provided on the lower end with an elongated hub 4 secured to the shaft 3 by a set screw 5. The ends of the hub 4 are offset downwardly and have oppositely extending blade members 6 secured to them respectively by bolts $6a$, see Figs. 4 and 5. By these means the blades 6 may be conveniently removed for sharpening.

As illustrated in Fig. 11, the motor platform $a2$ may be constructed of sheet material convexed as at a3 to provide a lighter weight construction than that shown in Figs. 1 and 6, but having the requisite strength and rigidity for supporting the motor.

The forward end of the platform a is rounded as at a', and is provided with a circumferential downwardly extending fender 7 which serves to bend the grass over and hold it while being cut by the blades 6, see Fig. 6.

Brace rods p and q are provided, see Figs. 1, 2 and 3, for the front and rear of my mower, connecting the brackets k and e to the motor 2, respectively. The rod p is secured to the bracket k by a bolt and placed centrally between the bolts l.

A U-shaped bracket 10, transversely secured to the underside of the platform a preferably diametrically of the axis of rotation of the said blades 6, is provided with a roller 11 and adapted to serve as a guard.

A handle 12 for pushing and guiding my mower is provided pivotally connected to the shaft d by means of forked brackets 13. A device is provided for holding the handle 12 in a desired position comprising a rod 14, pivoted conveniently on the motor 2 and extending through a slot 15 in the handle 12. The rod 14 is provided with notches 16 adapted to engage the edge of a plate 15a, secured at the lower edges of the slot 15, whereby the handle 12 is held in a desired position but may be lowered by merely raising the rod 14 and disengaging the notches 16 from the said plate 15a.

Operation.—The blades 6 being rotated at a high rate of speed by the motor 2, the mower is pushed by the operator and the forward portion of the fender 7 bends the grass over and holds it while it is cut off by the blade 6, somewhat after the manner of a scythe or sickle except that the grass is cut off evenly and efficiently regardless of height or thickness.

The rearward portion of the platform a is cut away to permit the ground wheels b to be mounted on the shaft d within the swath cut by the blades 6. Thus the mower can be operated closely to a wall or fence and the wheels will not press down the grass which is yet uncut as would be the case were the wheels located outside the swath cut by the mower.

In Fig. 7 I have shown a circular blade 20 provided with peripheral notches 21, one edge 22 of which is in radial alignment and the other edge 23 is curved oppositely to the direction of rotation and serves as the cutting edge also after the manner of a scythe or sickle.

In Figs. 8 to 10 I have illustrated a modified form of mower in which the blade is rotated by the driving force of the ground wheels.

In such modification the platform 30 is provided with rear driving ground wheels 31 mounted on stub shafts 32 secured to the platform by means of rearwardly extending brackets 33.

The blade 20, see Fig. 7, is secured to a vertical shaft 36 journaled in the platform 30. A bevel pinion 37 is secured to the upper end of the said shafts 36, meshing with a bevel gear 38 carried by a stub shaft 39, journaled in bearings 40. The other end of the stub shaft 38 is provided with a bevel pinion 41 meshing in turn with a gear 42 carried by a transverse shaft 43 journaled in and extending thru the walls of a suitable housing 44.

The ends of the shaft 43 are provided with ratchet mounted pinions, not shown, meshing with an internal gear carried by the wheels 31, in the usual manner of the conventional lawn mower.

Thus the blade 20 will be rotated at a high rate of speed by the rotation of the wheels 21, as the mower is pushed forwardly over the lawn, to cut the grass evenly and efficiently.

I claim:

In a motor lawn mower comprising a body and a motor driven rotated horizontal cutting blade below the body, a housing inclosing the motor, a vertically adjustable wheel-bearing axle mounted on the rear end of the body, threaded posts mounted on the front end of the body, a caster bracket adjustably mounted on said posts, nuts threaded on said posts securing the bracket in position, and a bracing element connecting the said caster bracket with said housing.

WALFRED LUNDIN.